US008229729B2

(12) United States Patent  
Sarikaya et al.

(10) Patent No.: US 8,229,729 B2  
(45) Date of Patent: Jul. 24, 2012

(54) MACHINE TRANSLATION IN CONTINUOUS SPACE

(75) Inventors: Ruhi Sarikaya, Shrub Oak, NY (US); Yonggang Deng, Yorktown Heights, NY (US); Brian Edward Doorenbos Kingsbury, Cortlandt Manor, NY (US); Yuqing Gao, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 12/054,636

(22) Filed: Mar. 25, 2008

(65) Prior Publication Data

US 2009/0248394 A1    Oct. 1, 2009

(51) Int. Cl.
G06F 17/20 (2006.01)
G06F 17/27 (2006.01)
G10L 15/04 (2006.01)
G10L 15/14 (2006.01)
G10L 15/28 (2006.01)
G10L 15/06 (2006.01)

(52) U.S. Cl. ............. 704/4; 704/2; 704/5; 704/7; 704/8; 704/9; 704/254; 704/256; 704/256.2; 704/256.4; 704/250; 704/255; 704/251; 704/244

(58) Field of Classification Search ................... 704/2, 4, 704/5, 7, 8, 9, E17.005, 254, 256, 256.2, 704/256.4, 250, 255, 251, 244
See application file for complete search history.

(56) References Cited

U.S. PATENT DOCUMENTS 5,278,980 A * 1/1994 Pedersen et al. ...................... 1/1
5,825,978 A * 10/1998 Digalakis et al. ............. 704/256
5,907,821 A * 5/1999 Kaji et al. .......................... 704/4
6,556,972 B1 * 4/2003 Bakis et al. .................... 704/277
7,251,637 B1 * 7/2007 Caid et al. ........................ 706/15
7,643,985 B2 * 1/2010 Horvitz .............................. 704/2
8,090,570 B2 * 1/2012 Waibel et al. ...................... 704/2
2006/0009963 A1 * 1/2006 Gaussier et al. ................... 704/7
2007/0016401 A1 * 1/2007 Ehsani et al. ...................... 704/9
2007/0150257 A1 * 6/2007 Cancedda et al. ................. 704/2
2007/0260459 A1 * 11/2007 Zhu .............................. 704/254
2007/0271088 A1 * 11/2007 Waibel et al. ...................... 704/9
2007/0299838 A1 * 12/2007 Behrens et al. ................... 707/5

(Continued)

OTHER PUBLICATIONS

Sadat, F., Yoshikawa, M., and Uemura, S. 2003. Learning bilingual translations from comparable corpora to cross-language information retrieval: hybrid statistics-based and linguistics-based approach. In Proceedings of the Sixth international Workshop on information Retrieval with Asian Languages, vol. 11 (Sapporo, Japan, Jul. 7-7, 2003), 57-64.*

(Continued)

Primary Examiner — Douglas Godbold  
Assistant Examiner — Edgar Guerra-Erazo  
(74) Attorney, Agent, or Firm — Tutunjian & Bitetto, P.C.; Anne V. Dougherty, Esq.

(57) ABSTRACT

A system and method for training a statistical machine translation model and decoding or translating using the same is disclosed. A source word versus target word co-occurrence matrix is created to define word pairs. Dimensionality of the matrix may be reduced. Word pairs are mapped as vectors into continuous space where the word pairs are vectors of continuous real numbers and not discrete entities in the continuous space. A machine translation parametric model is trained using an acoustic model training method based on word pair vectors in the continuous space.

19 Claims, 2 Drawing Sheets

U.S. PATENT DOCUMENTS

2009/0018833 A1* 1/2009 Kozat et al. .................. 704/257
2009/0182547 A1* 7/2009 Niu et al. .......................... 704/2

OTHER PUBLICATIONS

Probst, K. 2003. Using 'smart' bilingual projection to feature-tag a monolingual dictionary. In Proceedings of the Seventh Conference on Natural Language Learning At HLT-NAACL 2003—vol. 4 (Edmonton, Canada). Human Language Technology Conference. Association for Computational Linguistics, Morristown, N J, 103-110.*

Dumais, S.; Letsche, T.; Littman, M. L.; and Lan-dauer, T. 1997. Automatic cross-language retrievalusing latent semantic indexing. In AAAI Symposiumon Cross-Language Text and Speech Retrieval. Amer-ican Association for Articial Intelligence.*

Sahlgren, M. and Karlgren, J. 2005. Automatic bilingual lexicon acquisition using random indexing of parallel corpora. Nat. Lang. Eng. 11, 3 (Sep. 2005), 327-341.*

Jiang, F. and Littman, M. L. 2000. Approximate Dimension Equalization in Vector-based Information Retrieval. In Proceedings of the Seventeenth international Conference on Machine Learning (Jun. 29-Jul. 2, 2000). P. Langley, Ed. Morgan Kaufmann Publishers, San Francisco, CA, 423-430.*

Gao, Y. et al. "IBM Mastor System: Multilingual Automatic Speech-to-speech Translator," Proceedings of the Workshop on Medical Speech Translation at HLT-NAACL, Jun. 9, 2006.*

R. Zhang, et al., "A unified approach in speech-to-speech translation: integrating features of speech recognition and machine translation," in Proc. of COLING, Geneve, Switzerland, 2004.*

\* cited by examiner

MACHINE TRANSLATION IN CONTINUOUS SPACE

GOVERNMENT RIGHTS

This invention was made with Government support under Contract No.: NBCH2030001 awarded by Defense Advanced Research Projects Agency (DARPA). The Government has certain rights in this invention.

BACKGROUND

1. Technical Field

The present invention relates to machine translation systems and methods and more particularly to performing machine translation in continuous space between languages.

2. Description of the Related Art

In phrase based statistical machine translation (SMT) systems, estimates of conditional phrase translation probabilities are a major source of translation knowledge. The state-of-the-art SMT systems use maximum-likelihood estimation from relative frequencies to obtain conditional probabilities. A phrase pair extraction is based on an automatically word-aligned corpus of bilingual sentence pairs. The alignment consists of information about which source language words are linked to which target language words. These links indicate that either the pairs are translations of each other, or they are parts of phrases that are translations of each other. In the phrase based SMT systems every possible phrase pair up to a pre-defined phrase-length with the following constraints are extracted; 1) phrases must contain at least one pair of linked words, 2) phrases must not contain any words that have links to other words not included in the phrase pair.

In the state-of-the-art method, the phrase translation probabilities are estimated simply by marginalizing the counts (C) of phrase instances. For example, $$p(x|y) = \frac{C(x, y)}{\sum_{x'} C(x', y)}.$$

This method is used to estimate the conditional probabilities of both target phrases, given source phrases, and source phrases, given target phrases. In spite of its success, the state-of-the-art phrase pair conditional probability estimation method suffers from several major drawbacks. These drawbacks include: 1) overtraining, 2) lack of generalization, 3) lack of adaptation and 4) lack of discrimination.

The overtraining problem (1) arises because the empirical distributions, which are estimated as described above, overfit a training corpus and suffer from data sparseness. For example, phrase pairs that occur only once in the corpus, are assigned conditional probability of 1, higher than the probabilities of pairs for which much more evidence exists. However, overlapping phrase pairs are in direct competition during decoding, and have the potential to significantly degrade translation quality.

The generalization problem (2) arises because decoding with the state-of-the-art model does not propose phrase translations that are not observed in the training parallel corpus. Typically, the phrase translation table contains millions of entries, and phrases of up to tens of words. Additionally, the current methods fail to model the semantic similarities between the word and sentence pairs. For example, the sentences: "The cat walks in the bedroom", and "A dog runs in the room" are quite similar in structure, but state-of-the-art models are unconscious of this similarity and are incapable of using the similarity.

The adaptation (to a new domain, speaker, genre and language) issue (3) has not been addressed at all in machine translation so far, because a phrase translation table has a huge number of parameters. The typical practice is to collect a large amount of data (sentence pairs) for the target domain to build an SMT system, rather than adapting an existing system to the target domain/application. This is because it is very difficult to adapt an existing SHT system using a relatively small amount of target domain/application data.

Regarding the discrimination problem (4), probabilities of the phrase translation pairs are estimated based on empirical counts. However, discriminatively estimating phrase pair probabilities can and should improve the overall system performance.

SUMMARY

A system and method for training a statistical machine translation model and machine translation includes creating a source word versus target word co-occurrence matrix (or source word/phrase versus target word/phrase matrix) to define word pairs and reduce dimensionality of the matrix. Word pairs are mapped as vectors into continuous space where the word pairs are not discrete entities in the continuous space, but rather are a vector of real numbers. A parametric model for machine translation is trained using an acoustic model training method based on the word pair vectors in the continuous space. A pair-probability of a word or phrase based on word-pair translation probabilities using the parametric model are computed during decoding. The word or phrase is translated in accordance with a machine translation search that employs the translation probabilities.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
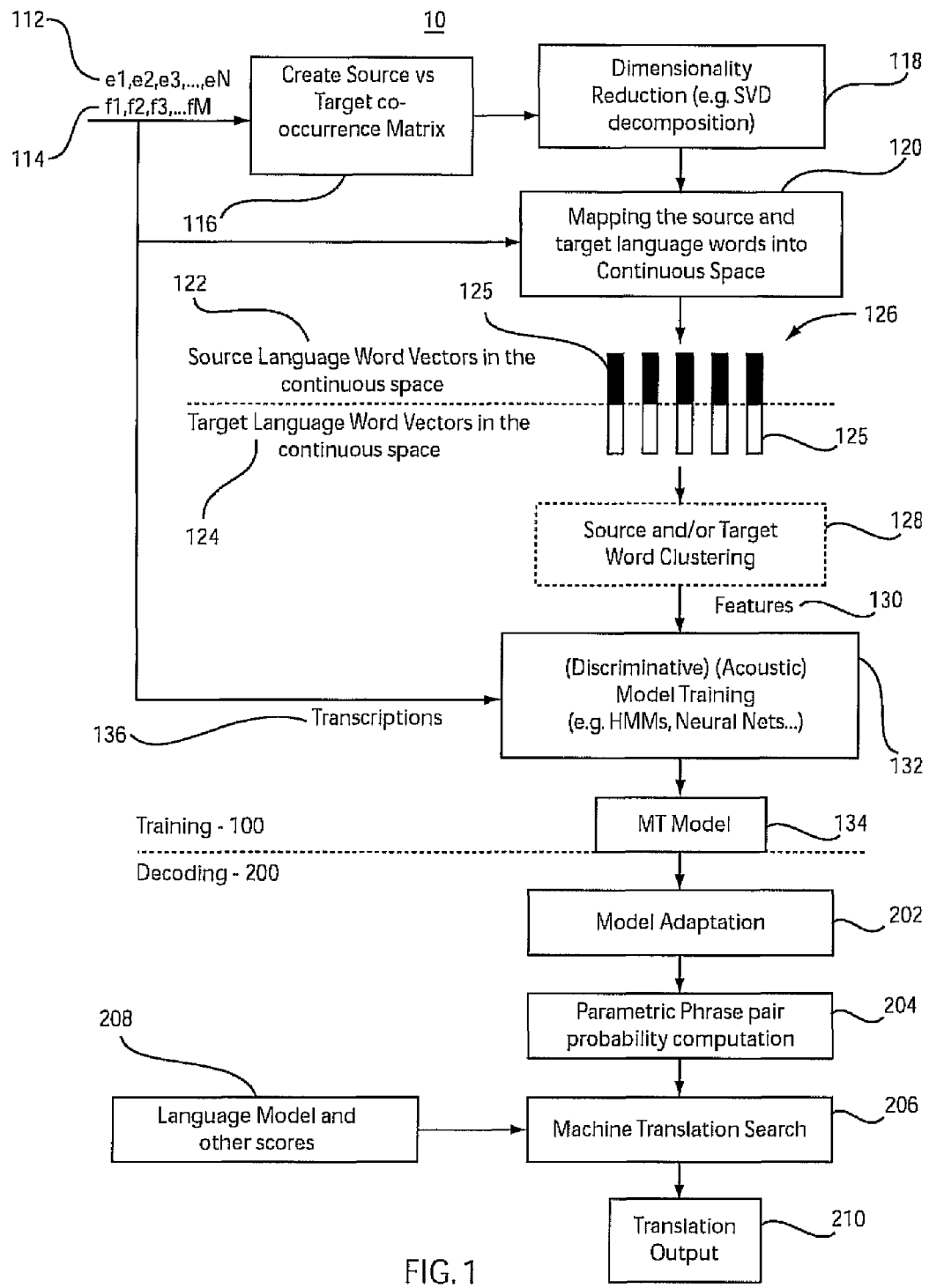
FIG. 1 is a block/flow diagram showing a system/method for training a parametric model in continuous space and decoding a word or phrase using the parametric model in accordance with an illustrative embodiment.

In accordance with the present principles, machine translation is performed in continuous space. This is achieved be employing a trainable parametric model for representing word/phrase translation pairs using word/phrase representations in a continuous parameter space. Then, using the continuous space representations, a translation model may be built based on, e.g., Tied-Mixture Gaussian probability density functions or other Hidden Markov Models (HMM). By doing so, we convert the machine translation problem to an acoustic model training problem in speech recognition.

For acoustic models, a large model can be efficiently adapted using just a few utterances. This is primarily achieved by exploiting the inherent structure (several thousand context dependent states are shared by all the words in the dictionary) in the model by techniques like maximum likelihood linear regression (MLLR).

As such, we can improve the state-of-the-art machine translation systems in several ways, including, generalization to unseen events, adaptation to new domains/languages/genre/speakers, discrimination through discriminative training methods such maximum likelihood linear regression (MLLR), Maximum-Mutual Information Estimation (MMIE) or Minimum Phone Error (MPE). In one embodiment, a Tied-Mixture Machine Translation (TMMT) model leads to improved accuracy in state-of-the-art machine translation systems.

The systems and method in accordance with the present principles project the words/phrases onto a continuous space and use a probability estimator operating on this space. We also provide a trainable parametric model for representing word/phrase translation pairs using the continuous space representations of the words/phrases. This model may be based on Tied-Mixture Gaussian probability density functions. By doing so, we convert the machine translation problem to an acoustic model training problem in speech recognition. We report experiments demonstrating the viability of the present principles.

One of the most important problems that face the state-of-the-art machine translation (MT) models is adaptation. Acoustic models are easily adapted from a relatively small number of sentences by utilizing the structure in the model and techniques like maximum likelihood linear regression (MLLR). To the best of our knowledge, there are no successful MT adaptation methods. The main reason is that it is inherently difficult, in the absence of any structure, to adapt a large number of parameters from little adaptation or test data. The introduced Hidden Markov Models (HMM) (e.g. Gaussian mixture models and tied-mixture models are specific realizations of HMMs) for machine translation in the continuous parameter space can be used to overcome this problem by using common word-pairs existing between phrase-pairs.

MT models need to properly model the various constraints and dependencies, both local and global, present within and across the source and target languages. While local constraints are readily captured through phrases, global constraints, such as long-term semantic dependencies, have been more difficult to handle within a data-driven framework. Mapping of the discrete source and target word entities via latent semantic analysis, a paradigm that automatically uncovers the hidden semantic relationships between source and target words in a given parallel corpus, permits us to model the semantic dependencies both within and across the languages.

In the present approach, source and target words are mapped onto a (continuous) semantic vector space, in which familiar clustering techniques can be applied. This leads to a novel framework for machine translation, which can exploit the semantic dependencies both within and across languages. Moreover, in the semantic vector space each source and target word is represented as a vector of real-numbers, (like feature vectors of speech recognition). There is also the notion of closeness between different words.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a system/method 10 for machine translation in continuous space is illustratively shown. The system/method 10 is split into a training portion or phase 100 and a decoding portion or phase 200. The training portion or phase 100 is employed for training the system model or models. The decoding portion 200 is employed to provide machine translation services. The portions or phases 100 and 200 may be employed together or separately depending on the application.

In accordance with the illustrative embodiment shown, the training phase 100 begins with a set of parallel sentences 112 and 114 that are translations of each other. Here, $\{e1, e2, e3, \ldots, eN\}$ shows the words of the source language sentence 112 and $\{f1, f2, f3, \ldots, fM\}$ shows the words of the target language sentence 114. Even though it is not a requirement. The sentence pairs can be aligned to find to tentative word alignments. That is, to find what source language words are translations of what target language words in a given sentence.

In block 116, a co-occurrence matrix of source language words versus target language words is created. This is a large but a sparse matrix. Note that, even though we are (and will be) describing source words and target words, this extends to source and target phrases. As such, the co-occurrence matrix can also be a matrix of source language phrase and target language phrase co-occurrences (rather than word versus word co-occurrence).

The source/target word/phrase pairs are considered as entries of the co-occurrence matrix), e.g., where the rows of the matrix represent the source words/phrases and the columns of the matrix represent the target words/phrases.

In block 118, the co-occurrence matrix goes through a dimensionality reduction step using such methods as singular-value decomposition (SVD) or non-negative matrix factorization (NMF), which are known in the art. In one embodiment, we apply singular value decomposition (SVD) to decompose the co-occurrence matrix into U and V matrices. U includes a set of latent source words and V includes a set of latent target words.

Latent source and target words are concatenated to obtain a latent word-pair vector. This permits the representation of each source and target language word as a latent word in a continuous space 126 in block 120. Each latent word is essentially a vector of real numbers. The source and target language word are mapped into the continuous vector space 126. The vector features may include features used in speech recognition.

This transforms the problem into a continuous parameter space with a well defined notion of similarity. That is, certain word/phrases are "closer" to each other than other words/phrases. The principle of working in a continuous space for estimating phrase translation probabilities is advantageous. In one embodiment, we employ Latent Semantic Analysis to map word/phrase pairs, which are discrete entities, into the continuous parameter space.

In a specific embodiment, in relation to speech recognition models, word-pairs can be considered as phones and phrase-pairs can be considered as words, where the "pronunciations" of this specific phrase-pair is defined by different word alignments of the source and the target phrase.

The word/phrase pairs/vectors can be generated in several ways. One way of generating these pairs is to align any source language word/phrase to any other target language word/phrase for a given sentence pair. Another way is to use existing tools to generate word/phrase alignments. The latter method leads to a sparser source word/phrase target word/phrase matrix. Directional alignments, union of the alignments for both directions or something in between may be employed.

Having generated the alignments, we effectively have transformed the phrase table generation process into an acoustic model training process. This will allow us to use existing acoustic modeling tools to build a parametric word/phrase translation table.

Word-pair vectors 125 can be constructed by concatenating source vectors 122 and target vectors 124 corresponding to source and the target language words. In the continuous space 126, either the source and/or target language word or the word-pairs can undergo an optional clustering step 128 for robust parameter estimation for rarely observed words or word-pairs. Latent semantic analysis employs a continuous representation for semantic clustering of words. In this space, there is a notion of "distance" between different entities. This helps to generalize from seen to unseen events during translation by being able to use clusters of similar information to assist in performing translations.

Vectors of the features are written in continuous space. Corresponding transcriptions 136 are the word/phrase pair sequences from the input. Transcriptions 136 are input to block 132. In block 132, choosing the model structure is one important step in estimating reliable model parameters. Unlike acoustic modeling where there are a sufficiently large number of examples per context dependent state, the training data is orders of magnitude smaller than the acoustic data. To deal with model robustness, we use a tied-mixture model structure, where Gaussian densities are shared by all the states. Each state has a unique set of mixture weights. As such, we have called the present method: Tied Mixture Machine Translation (TMMT).

Training TMMT is similar to building acoustic models. This is a key feature for taking advantage of numerous acoustic modeling methods that have been developed over the last several decades including HMMs, neural networks, etc. In particular, in block 132, we can now discriminatively train the TMMT models using, e.g., Maximum Likelihood (ML), Maximum-Mutual Information Estimation (MMIE), Minimum Phone Error (MPE) training, Max-margin Training, Minimum Classification Error (MCE) training. We can also adapt TMMT models to a new domain/language/genre/speaker (see also block 202).

In block 132, a feature sequence and corresponding word-pair transcriptions are ready to train a parametric MT model 134, which is similar to an acoustic model in speech recognition. Therefore, an MT model 134 can be trained using off-the-shelf speech recognition acoustic model training tools. Here, the MT model 134 can be trained using maximum likelihood criterion, followed by a discriminative training step employing such techniques as MPE, MMIE or MCE. We can also apply feature space versions of these methods, i.e., boosted MMI (BMMI), fMPE, etc.

The MT model 134 can be, e.g., a Hidden Markov Model (HMM), a neural network model, etc. Note that for the given problem using tied-mixture models or Gaussian mixture models (both of which are just special topologies and are considered special cases of HMMs) may have advantages over the traditional 3-state left-to-right HMM topology widely used in speech recognition. Now, the offline model training phase is completed. Next, the decoding phase 200 is described.

The present MT system permits online or offline model adaptation to new domains/genres/speakers/languages particularly in the presence of small amounts of adaptation data. We are not aware of any adaptation technique applied to MT models. The present system/method permits adaptation of the MT models in block 202. The MT model 134 can be adapted using such techniques as MLLR, maximum a posteriori probability (MAP), fMLLR, fMPE, etc.

Now, in block 204, a word-pair or phrase-pair translation probability can be estimated using a parametric model. The (word) phrase-pair translation probabilities can be combined using a language model score, fertility scores, reordering scores, distortion scores or other scores in block 208. The translation probabilities are employed to provide a best result to a machine translation search in block 206. The results of which generate a translation output in block 210.

Figure 2:
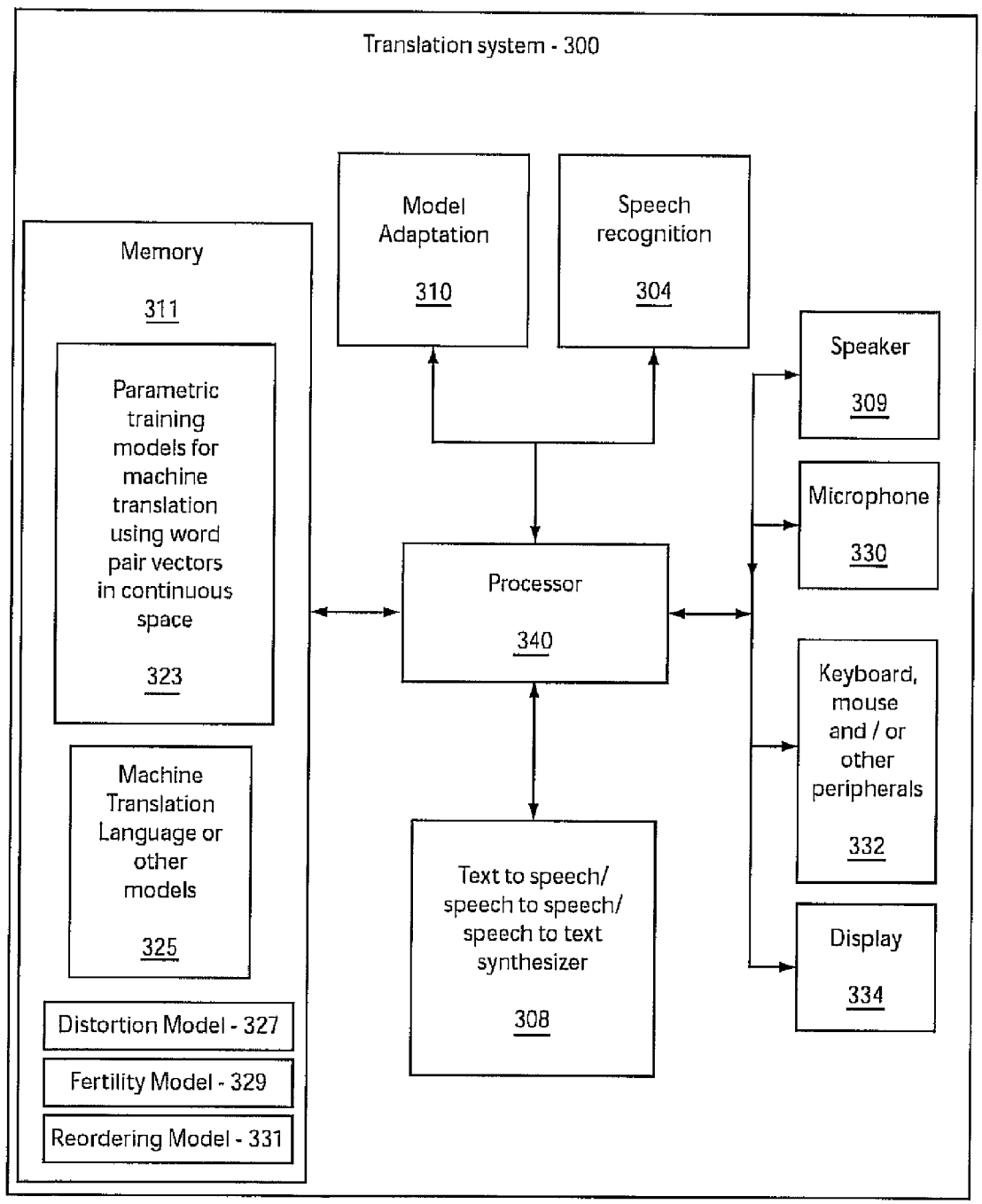
FIG. 2 is a block diagram showing an illustrative system which employs a parametric model for machine translation in accordance with one embodiment.

Referring to FIG. 2, a block diagram of a system for machine translation 300 is illustratively shown. System 300 may include a dedicated translator or may be incorporated into a cellular telephone, a personal digital assistant or any other computer device. System 300 includes a machine translation system that collects an input word or phrase in text or from a speaker, which is recognized in a source language using, e.g., an automatic speech recognition (ASR) engine 304 and may convert the speech to text. The machine translation (MT) system 300 translates the recognized messages into the target language. System 300 may synthesize speech for the translated sentence, which is output by way of a speaker 309 using a text-to-speech synthesis (TTS) module 308. The TTS 308 may include the capability of text to speech, speech to speech and speech to text synthesis.

System 300 includes a memory 311 for recording speech and/or text. Memory 311 also stores parametric training models 323, language models 325, a distortion model 327 (which specifies a window for alignment of words between languages), a fertility model 329 (to determine how many words can be mapped, that is a number of words a source word can produce or match to in the target language), and a reordering model 331 (to generate word ordering between languages) for the machine translation function.

A user can interact with system 300 by speaking into a microphone 330, or employing other peripheral devices 332, such as a keypad/board, a mouse, a touch-sensitive screen, etc. Responses and outputs may be by way of speaker(s) 309, a display 334, and/or peripherals 332 (e.g., a printer, etc.).

A processor 340 may include or work with an operating system for controlling the operations of system 300. A model adaptation module 310 includes functionality for adapting the models 323 and 325 depending on a desired application or environmental conditions.

The machine translation system/method 300 has the following advantages over the prior art MT systems: 1) It is parametric rather than based on empirical counts. 2) It has better generalization capability to unseen events. 3) It can be adapted to new domains/speakers/tasks/languages with little data. 4) The MT model 323 can be discriminatively trained. 5) It uses orders of magnitude less space than the prior art methods. All we need to store is, e.g., 150-200 basis vectors, generated by, say SVD decomposition, rather than huge phrase tables.

The present embodiments permit any speech recognition acoustic modeling and adaptation methods and tools to be used to train the MT models. Unlike the existing prior art, which does not exploit the underlying common word-pairs within phrases, in the present embodiments, word-pairs are the building blocks and contribute to probability estimation of all phrases that include the word-pairs.

In a specific embodiment, the system/method can be adapted using Maximum Likelihood Linear Regression (MLLR), feature-space MLLR, feature space MPE (fMPE), MAP adaptation techniques, Having described preferred embodiments of a system and method for machine translation in continuous space (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for training a statistical machine translation model, comprising:
creating a source word versus target word co-occurrence matrix to define word pairs;
reducing dimensionality of the matrix;
mapping word pairs as vectors into continuous space using a processor, where the word pairs are vectors of continuous real numbers and not discrete entities in the continuous space; and
training a machine translation parametric tied-mixture model using an acoustic model training method based on word pair vectors in the continuous space, wherein a tied-mixture model has a plurality of states that share Gaussian densities, each state having a unique set of mixture weights.

2. The method as recited in claim 1, further comprising: clustering the vectors based upon at least one of source words and target words.

3. The method as recited in claim 1, wherein the source word versus target word co-occurrence matrix includes phrases, phrase pairs and word to phrase pairs.

4. The method as recited in claim 1, wherein reducing includes reducing dimensionality of the matrix by employing one of singular-value decomposition (SVD) and non-negative matrix factorization (NMF).

5. The method as recited in claim 1, wherein mapping includes considering word-pairs as phones and phrase-pairs as words.

6. The method as recited in claim 5, wherein pronunciation of a phrase-pair is defined by different word alignments of a source phrase and a target phrase.

7. The method as recited in claim 1, wherein mapping word pairs as vectors includes aligning a source language word to any other target language word for a given sentence pair.

8. The method as recited in claim 1, wherein training includes training the parametric model using at least one of Maximum Likelihood (ML), Maximum-Mutual Information Estimation (MMIE), Minimum Phone Error (MPE) training, Max-margin Training, and Minimum Classification Error (MCE) training.

9. The method as recited in claim 1, wherein training includes adapting the model to at least one of a new domain, language, genre, and speaker.

10. A non-transitory computer readable storage medium comprising a computer readable program for training a statistical machine translation model, wherein the computer readable program when executed on a computer causes the computer to perform the steps of:
creating a source word versus target word co-occurrence matrix to define word pairs;
reducing dimensionality of the matrix;
mapping word pairs as vectors into continuous space where the word pairs are vectors of continuous real numbers and not discrete entities in the continuous space; and
training a machine translation parametric tied-mixture model using an acoustic model training method based on word pair vectors in the continuous space, wherein a tied-mixture model has a plurality of states that share Gaussian densities, each state having a unique set of mixture weights.

11. A method for machine translation, comprising:
adapting a parametric tied-mixture model in accordance with a given state, wherein a tied-mixture model has a plurality of states that share Gaussian densities each state having a unique set of mixture weights, the model including mapped word pairs as vectors in continuous space where the word pairs are vectors of continuous real numbers and not discrete entities in the continuous space, and the model being trained using an acoustic model training method based on word pair vectors in the continuous space;
computing a pair-probability of a word or phrase based on word-pair translation probabilities using the parametric model; and
translating the word or phrase in accordance with a machine translation search that employs the translation probabilities.

12. The method as recited in claim 11, wherein the translation probabilities are combined with at least one of a language model score, and another score to translate the word or phrase.

13. The method as recited in claim 11, wherein adapting includes adapting to at least one of a new domain, genres, speaker, and language.

14. The method as recited in claim 11, wherein adapting includes adapting using at least one of maximum likelihood linear regression (MLLR), maximum a posteriori (MAP), feature MLLR (fMLLR), and feature Minimum Phone Error (fMPE).

15. A non-transitory computer readable storage medium comprising a computer readable program for machine translation, wherein the computer readable program when executed on a computer causes the computer to perform the steps of:

adapting a parametric tied-mixture model in accordance with a given state, wherein a tied-mixture model has a plurality of states that share Gaussian densities, each state having a unique set of mixture weights, the model including mapped word pairs as vectors in continuous space where the word pairs are vectors of continuous real numbers and not discrete entities in the continuous space, and the model being trained using an acoustic model training method based on word pair vectors in the continuous space;

computing a pair-probability of a word or phrase based on word-pair translation probabilities using the parametric model; and translating the word or phrase in accordance with a machine translation search that employs the translation probabilities.

16. The computer readable medium as recited in claim 15, wherein the translation probabilities are combined with at least one of a language model score and another score to translate the word or phrase.

17. The computer readable medium as recited in claim 15, wherein adapting includes adapting to at least one of a new domain, genres, speaker, and language.

18. The computer readable medium as recited in claim 15, wherein adapting includes adapting using at least one of maximum likelihood linear regression (MLLR), maximum a posteriori (MAP), feature MLLR (fMLLR), and feature Minimum Phone Error (fMPE).

19. The method of claim 1, wherein creating a source word versus target word co-occurrence matrix to define word pairs comprises concatenating a source word and a target word into a word pair.

* * * * *